(12) United States Patent
Taki et al.

(10) Patent No.: US 8,168,560 B2
(45) Date of Patent: May 1, 2012

(54) EXHAUST GAS PURIFYING CATALYST

(75) Inventors: Kenichi Taki, Shizuoka (JP); Akimasa Hirai, Shizuoka (JP); Ichiro Kitamura, Shizuoka (JP)

(73) Assignee: Cataler Corporation, Kakegawa-Shi, Shizuoka (JP)

( * ) Notice: Subject to any disclaimer, the term of this patent is extended or adjusted under 35 U.S.C. 154(b) by 74 days.

(21) Appl. No.: 12/067,837

(22) PCT Filed: Oct. 4, 2006

(86) PCT No.: PCT/JP2006/319885
§ 371 (c)(1),
(2), (4) Date: Mar. 24, 2008

(87) PCT Pub. No.: WO2007/040248
PCT Pub. Date: Apr. 12, 2007

(65) Prior Publication Data
US 2009/0275468 A1 Nov. 5, 2009

(30) Foreign Application Priority Data

Oct. 5, 2005 (JP) .................................. 2005-292626

(51) Int. Cl.
*B01D 53/94* (2006.01)
*B01J 23/42* (2006.01)
*B01J 23/44* (2006.01)
*B01J 23/46* (2006.01)

(52) U.S. Cl. ..................... 502/304; 423/213.5; 502/333; 502/339

(58) Field of Classification Search ................... 502/102, 502/103, 300–307, 319–330, 333, 339
See application file for complete search history.

(56) References Cited

U.S. PATENT DOCUMENTS

| 3,965,040 | A | | 6/1976 | Kobylinski et al. |
| 4,152,301 | A | | 5/1979 | Summers et al. |
| 4,153,579 | A | | 5/1979 | Summers et al. |
| 5,212,142 | A | * | 5/1993 | Dettling .................. 502/304 |
| 5,459,119 | A | | 10/1995 | Abe et al. |
| 5,597,771 | A | * | 1/1997 | Hu et al. .................. 502/304 |
| 6,080,375 | A | | 6/2000 | Mussmann et al. |
| 6,294,140 | B1 | * | 9/2001 | Mussmann et al. ........ 423/213.5 |
| 6,514,905 | B1 | | 2/2003 | Hanaki et al. |

(Continued)

FOREIGN PATENT DOCUMENTS

CN 1197686 11/1997

(Continued)

OTHER PUBLICATIONS

Notice of Reason(s) for Rejection dated Apr. 26, 2011 corresponding to Japanese application No. 2007-538781.

(Continued)

*Primary Examiner* — Stanley Silverman
*Assistant Examiner* — Syed Iqbal
(74) *Attorney, Agent, or Firm* — Davis & Bujold, P.L.L.C.

(57) ABSTRACT

An exhaust gas purifying catalyst is provided which includes a catalyst substrate and a catalyst coating layer. The catalyst coating layer is formed on the catalyst substrate and contains a noble metal and a refractory inorganic oxide. The catalyst coating layer has a layered structure including an A-layer and a B-layer. The A-layer contains Pd and Pt as the noble metal in a weight ratio of 3:1 to 20:1. The B-layer includes Rh as the noble metal.

20 Claims, 14 Drawing Sheets

U.S. PATENT DOCUMENTS

| | | |
|---|---|---|
| 2003/0216254 A1 | 11/2003 | Takeshima et al. |
| 2006/0217263 A1* | 9/2006 | Kawamoto et al. ............ 502/304 |
| 2009/0181847 A1* | 7/2009 | Yabuzaki et al. ............. 502/339 |

FOREIGN PATENT DOCUMENTS

| | | |
|---|---|---|
| CN | 1271618 | 11/2000 |
| CN | 1460545 | 5/2003 |
| EP | 1046423 | 25/2000 |
| EP | 0 262 962 A2 | 4/1988 |
| EP | 0 462 593 A1 | 6/1991 |
| EP | 0 852 966 A1 | 7/1998 |
| EP | 1066874 | 10/2001 |
| EP | 1 252 924 | 10/2002 |
| JP | 7060117 | 3/1995 |
| JP | 7185353 A | 7/1995 |
| JP | 8057323 | 3/1996 |
| JP | 8089816 A | 4/1996 |
| JP | 10501737 | 2/1998 |
| JP | 11076838 | 3/1999 |
| JP | 11-290686 | 10/1999 |
| JP | 11290686 | 10/1999 |
| JP | 2000502602 | 3/2000 |
| JP | 2000093803 A | 4/2000 |
| JP | 2001079402 | 3/2001 |
| WO | WO 95/35152 | 12/1995 |
| WO | WO 97/23278 | 7/1997 |
| WO | 03/035256 A2 | 5/2003 |

OTHER PUBLICATIONS

English translation of Notice of Reason(s) for Rejection dated Apr. 26, 2011 corresponding to Japanese application No. 2007-538781.

Notice of Reasons for Rejection, Japanese Patent Office, Jul. 12, 2011.

Japan Office Action "Notice of Reasons for Rejection". Mailing date Apr. Apr. 26, 2011 (English Translation Included).

Extended European Search Report Application No. 06811224.2 corresponding to the present U.S. application.

* cited by examiner

EXHAUST GAS PURIFYING CATALYST

TECHNICAL FIELD

The present invention relates to an exhaust gas purifying catalyst that removes toxic substances contained in exhaust gas from an internal combustion engine of an automobile, a motorcycle, and others.

BACKGROUND ART

An exhaust gas purifying catalyst is formed by coating a substrate made of ceramics or the like with a catalyst coating layer containing a refractory inorganic oxide and a noble metal such as Pd, Pt, Rh, and others. Such an exhaust gas purifying catalyst is known to employ a technique of forming the catalyst coating layer into a two-layer structure including an inside layer containing Pd and an outside layer containing Rh in order to improve catalytic performance (see Patent Literature 1).

Patent Literature 1: Unexamined Japanese Patent Publication No. 7-60117

DISCLOSURE OF THE INVENTION

Problems to be Solved by the Invention

However, due to more tightening of regulation values on exhaust gas in recent years, exhaust gas purifying catalysts are required to exhibit better performance. Also, since noble metals are expensive, an exhaust gas purifying catalyst is required to reduce the amount used of noble metals while the catalytic performance is maintained.

The present invention has been made in view of the above circumstances. An object of the present invention is to provide an exhaust gas purifying catalyst which exhibits high catalytic performance and brings about decrease in the amount of noble metals used.

Means to Solve the Problems

A first aspect of the present invention provides an exhaust gas purifying catalyst which includes a catalyst substrate and a catalyst coating layer. The catalyst coating layer is formed on the catalyst substrate and contains a noble metal and a refractory inorganic oxide. The catalyst coating layer has a layered structure including an A-layer and a B-layer. The A-layer contains Pd and Pt as the noble metal in a weight ratio of 3:1 to 20:1. The B-layer includes Rh as the noble metal.

The exhaust gas purifying catalyst of the present invention has excellent catalytic performance due to the above structure. Specifically, since the weight ratio of Pd to Pt in the A-layer is in a range from 3:1 to 20:1, the catalytic performance is remarkably high as compared to the case where the weight ratio is out of the range.

Since the exhaust gas purifying catalyst of the present invention exhibits excellent catalytic performance with low amount of noble metals, it is possible to bring about decrease in the amount of noble metals used. Accordingly, there is reduction in the manufacturing costs of the exhaust gas purifying catalyst.

In the present invention, it is further preferable that the weight ratio of Pd to Pt in the A-layer is in a range from 5:1 to 10:1.

In the present invention, examples of the refractory inorganic oxide are alumina (especially, activated alumina), Zr oxide, Ce oxide, cerium-zirconium compound oxide, silica, titania, and others. Examples of the cerium-zirconium compound oxide are cerium-zirconium compound oxide in which a relative proportion of $ZrO_2$ is 40 to 95 wt % (preferably, 50 to 95 wt %) (Zr rich compound oxide), and cerium-zirconium compound oxide in which a relative proportion of $CeO_2$ is 50 to 95 wt % (Ce rich compound oxide). The Zr rich compound oxide is preferably used as the refractory inorganic oxide in the B-layer. A preferable amount of the refractory inorganic oxide is 100 to 300 g per liter of the catalyst.

There is no particular limitation to the catalyst substrate as long as the catalyst substrate is the one normally used for an exhaust gas purifying catalyst. For example, a honeycomb substrate, a corrugated substrate, a monolith honeycomb substrate may be employed. The catalyst substrate may be made of any refractory material. For example, an integrally structured substrate made of refractory ceramics, such as cordierite or the like, or of metal, such as ferrite stainless steel or the like, may be employed.

Rh, Pd, Pt, and others may be employed as the noble metal, for example. The noble metal to be mixed into the B-layer may be Rh only, or a combination of Rh and other noble metal(s) (Pt, for example). The noble metal to be mixed into the A-layer may be merely Pd and Pt. Other noble metal(s) may be further added.

The catalyst coating layer (only A-layer, only B-layer, or the both layers) may contain Ba, La, Nd, Pr or Y. Specifically, Ba or La is preferable to be contained. A preferable amount of Ba or La is 0 to 30 g per liter of the catalyst.

The catalyst coating layer of the present invention may include only two layers, that is, the A-layer and the B-layer. Alternatively, the catalyst coating layer may include another layer, for example, on the outer side of the two layers, between the A-layer and the B-layer, or on the inner side of the two layers. Regarding the positional relationship between the A-layer and the B-layer, the A-layer may be referred to as an inside layer 5 and the B-layer may be referred to an outside layer 7, as in FIGS. 1 through 9. Or, the B-layer may be referred to as the inside layer 5 and the A-layer may be referred to as the outside layer 7, as in FIG. 10.

A second aspect of the present invention provides the exhaust gas purifying catalyst according to the first aspect wherein the A-layer contains, as a refractory inorganic oxide, (a) an alumina and (b) a cerium-zirconium compound oxide in which a relative proportion of $ZrO_2$ is 40 to 95 wt % (more preferably, 50 to 95 wt %). The weight ratio of (a) to (b) is in a range from 1:1 to 1:5.

The exhaust gas purifying catalyst of the present invention has further high catalytic performance since the weight ratio of (a) the alumina to (b) the cerium-zirconium compound oxide in which a relative proportion of $ZrO_2$ is 40 to 95-wt % is in a range from 1:1 to 1:5.

A third aspect of the present invention provides the exhaust gas purifying catalyst according to the first or second aspect wherein 70 wt % or more of Pd and Pt contained in the A-layer is in a region from a surface of the A-layer to a depth of 20 μm.

The exhaust gas purifying catalyst of the present invention has further high catalytic performance since 70 wt % or more of Pd and Pt contained in the A-layer is in the region from the surface of the A-layer to the depth of 20 μm (more preferably, 10 μm).

In the exhaust gas purifying catalyst of the present invention, 70 wt % or more of Pd contained in the A-layer may be in a region from the surface of the A-layer to the depth of 20 μm, and 70 wt % or more of Pt contained in the A-layer may be in a region from the surface of the A-layer to the depth of 20 μm.

In the present invention, if the A-layer contains another noble metal other than Pd and Pt, 70 wt % or more of the another noble metal is further preferably in the region from the surface of the A-layer to the depth of 20 μm (preferably, 10 μm).

A fourth aspect of the present invention provides the exhaust gas purifying catalyst according to one of the first to third aspect wherein 70 wt % or more of Rh contained in the B-layer is in a region from a surface of the B-layer to the depth of 20 μm.

The exhaust gas purifying catalyst of the present invention has further high catalytic performance since 70 wt % or more of Rh contained in the B-layer is in the region from the surface of the B-layer to the depth of 20 μm (more preferably, 10 μm).

In the present invention, if the B-layer contains another noble metal other than Rh (Pt, for example), 70 wt % or more of the another noble metal is further preferably in the region from the surface of the B-layer to the depth of 20 μm (more preferably, 10 μm).

A fifth aspect of the present invention provides the exhaust gas purifying catalyst according to one of the first to fourth aspect wherein the B-layer includes a cerium-zirconium compound oxide as the refractory inorganic oxide. A relative proportion of $ZrO_2$ in the cerium-zirconium compound oxide is 50 to 95 wt %.

The exhaust gas purifying catalyst of the present invention has further high catalytic performance since the B-layer includes cerium-zirconium compound oxide in which a relative proportion of $ZrO_2$ is 50 to 95 wt %.

A sixth aspect of the present invention provides the exhaust gas purifying catalyst according to one of first to fifth aspect wherein the B-layer includes Pt, in addition to Rh, as the noble metal. In the B-layer, a weight of Pt is one third or less of a weight of Rh.

The exhaust gas purifying catalyst of the present invention has further high catalytic performance since the B-layer includes Pt which is one third or less in weight of Rh.

EXPLANATION OF REFERENCE NUMERALS

1 . . . exhaust gas purifying catalyst
3 . . . substrate
5 . . . inside layer
7 . . . outside layer
9, 11 . . . surface region

BEST MODE FOR CARRYING OUT THE INVENTION

The present invention will be particularly explained hereinafter by way of embodiments.

Figure 1:
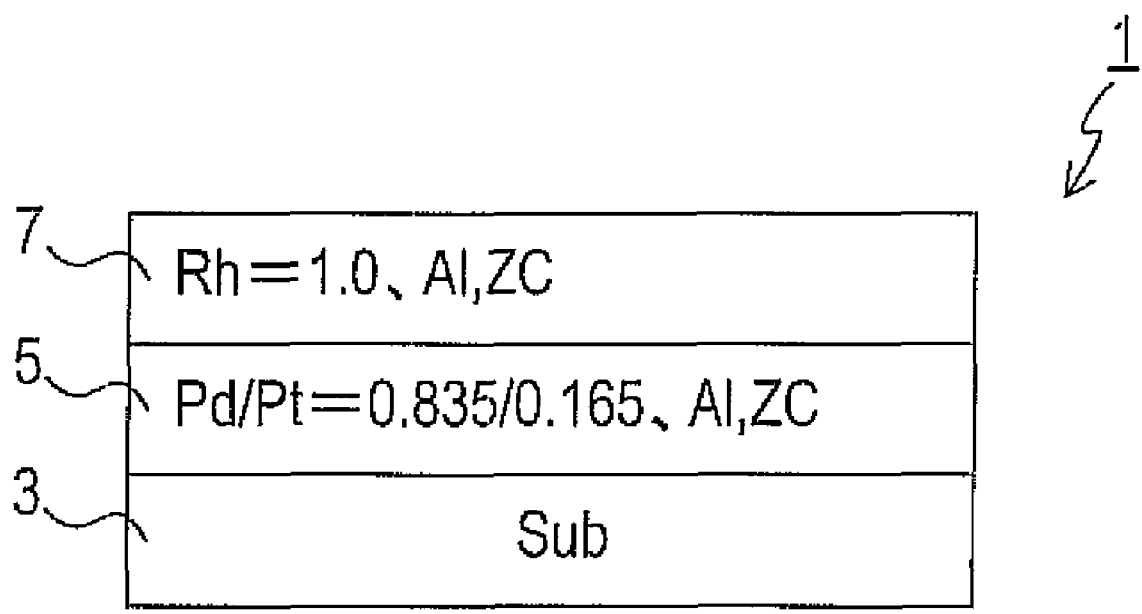
[FIG. 1] is an explanatory diagram showing a structure of an exhaust gas purifying catalyst according to an Embodiment 1.

Embodiment 1 a) A description will now be given on a structure of an exhaust gas purifying catalyst 1 of an Embodiment 1 with reference to FIG. 1. In FIG. 1 and in later-explained FIGS. 2 through 15, "ZC" represents a cerium-zirconium compound oxide in which a relative proportion of $ZrO_2$ is 80 wt % (Zr rich compound oxide), "Al" represents alumina, and "Sub" represents a substrate.

In the exhaust gas purifying catalyst 1, an inside layer (A-layer) 5 is formed on the surface of a substrate (catalyst substrate) 3, and an outside layer (B-layer) 7 is further formed on top of the inside layer 5. The inside layer 5 and the outside layer 7 function as a catalyst coating layer. A thickness of the respective inside layer 5 and outside layer 7 is 100 μm. The substrate 3 is a monolith honeycomb substrate having a capacity of 1.0 L and a cell density of 900 cells/in$^2$. The inside layer 5 and the outside layer 7 are formed on the inner face of each cell of the substrate 3.

The inside layer 5 includes Pd (0.835 g) and Pt (0.165 g) as the noble metal, an alumina and a Zr rich compound oxide.

The outside layer 7 includes Rh (1.0 g) as the noble metal, an alumina and a Zr rich compound oxide.

b) A description will now be given on a method of manufacturing the exhaust gas purifying catalyst 1 of the Embodiment 1.

Slurries S1A and S1B were prepared as below.
(Slurry S1A)

Below listed components (fine powder is used in the case of a solid component; the same applies below) were mixed to prepare the slurry S1A.

alumina: 50 g
Zr rich compound oxide (relative proportion of $ZrO_2$ is 80 wt %): 50 g
Pd nitrate solution: an amount containing 0.835 g of Pd
Pt nitrate solution: an amount containing 0.165 g of Pt
(Slurry S1B)

Below listed components were mixed to prepare the slurry S1B.

alumina: 50 g
Zr rich compound oxide (relative proportion of $ZrO_2$ is 80 wt %): 50 g
Rh nitrate solution: an amount containing 1.0 g of Rh A total amount of the slurry S1A was applied to coat the entire substrate 3. After dried at 250° C. for an hour, the coated substrate 3 was calcined at 500° C. for an hour. The inside layer 5 was formed by this step.

Thereafter, a total amount of the slurry S1B is applied to coat the entire substrate 3, and, after dried at 250° C. for an hour, calcined at 500° C. for an hour. The outside layer 7 was formed by this step thereby to finish the exhaust gas purifying catalyst 1.

Embodiment 2

Figure 2:
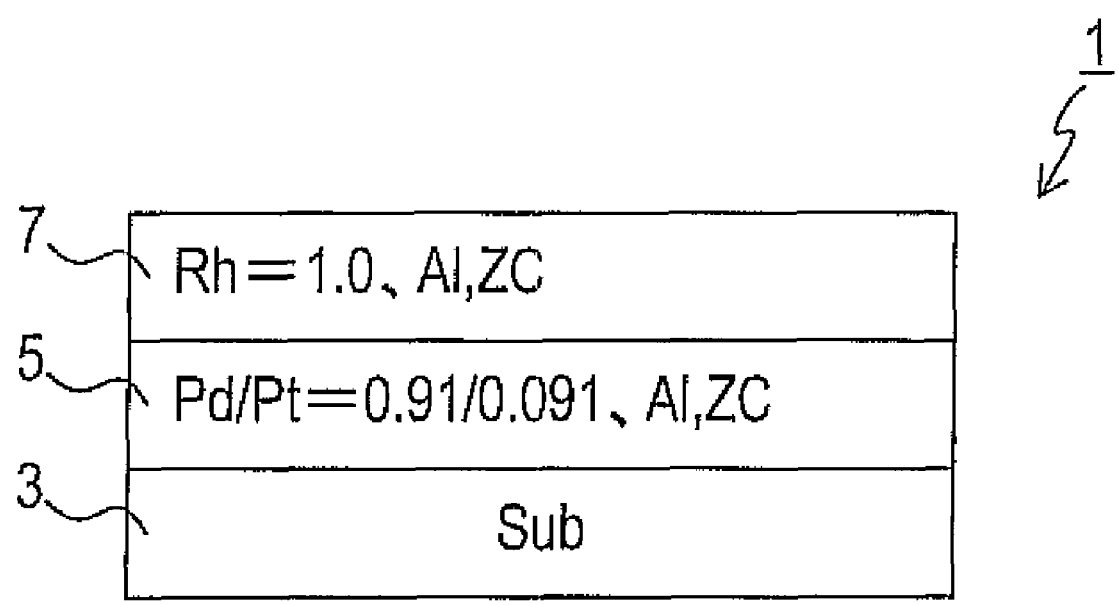
[FIG. 2] is an explanatory diagram showing a structure of an exhaust gas purifying catalyst according to an Embodiment 2.

The exhaust gas purifying catalyst 1 of an Embodiment 2 has basically the same structure as that of the Embodiment 1, as shown in FIG. 2. The Embodiment 2 is different from the Embodiment 1 in the amounts of the noble metals contained in the inside layer 5, that is, Pd: 0.91 g and Pt: 0.091 g.

The method of manufacturing the exhaust gas purifying catalyst 1 of the Embodiment 2 is basically the same as that of the Embodiment 1. In the Embodiment 2, a slurry S2 prepared by mixing below listed components was used in place of the slurry S1A.
(Slurry S2)
    alumina: 50 g
    Zr rich compound oxide (relative proportion of $ZrO_2$ is 80 wt %): 50 g
    Pd nitrate solution: an amount containing 0.91 g of Pd
    Pt nitrate solution: an amount containing 0.091 g of Pt In the Embodiment 2, a total amount of the slurry S2 was applied to coat the entire substrate 3, dried and calcined to form the inside layer 5. Thereafter, a total amount of the slurry S1B was applied to coat the entire substrate 3, dried and calcined to form the outside layer 7. In the Embodiment 2, and in later-explained Embodiments 3 through 9 and Comparative Examples 1 through 4, conditions for drying and calcination are the same as in the Embodiment 1.

Embodiment 3

Figure 3:
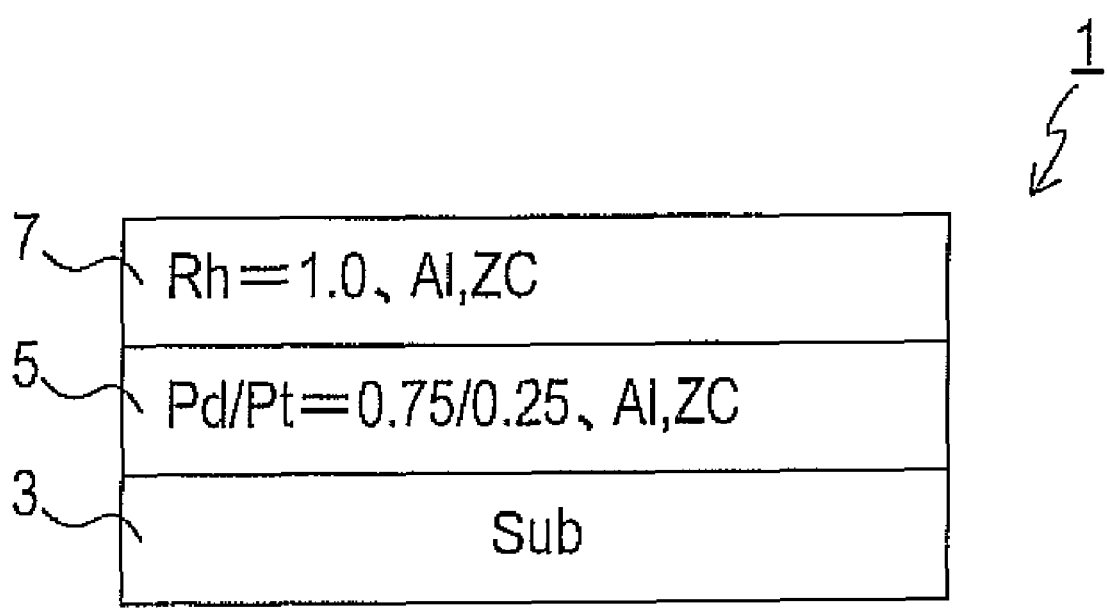
[FIG. 3] is an explanatory diagram showing a structure of an exhaust gas purifying catalyst according to an Embodiment 3.

The exhaust gas purifying catalyst 1 of an Embodiment 3 has basically the same structure as that of the Embodiment 1, as shown in FIG. 3. The Embodiment 3 is different from the Embodiment 1 in the amounts of the noble metals contained in the inside layer 5, that is, Pd: 0.75 g and Pt: 0.25 g.

The method of manufacturing the exhaust gas purifying catalyst 1 of the Embodiment 3 is basically the same as that of the Embodiment 1. In the Embodiment 3, a slurry S3 prepared by mixing below listed components was used in place of the slurry S1A.
(Slurry S3)
    alumina: 50 g
    Zr rich compound oxide (relative proportion of $ZrO_2$ is 80 wt %): 50 g
    Pd nitrate solution: an amount containing 0.75 g of Pd
    Pt nitrate solution: an amount containing 0.25 g of Pt In the Embodiment 3, a total amount of the slurry S3 was applied to coat the entire substrate 3, dried and calcined to form the inside layer 5. Thereafter, a total amount of the slurry S1B was applied to coat the entire substrate 3, dried and calcined to form the outside layer 7.

Embodiment 4

Figure 4:
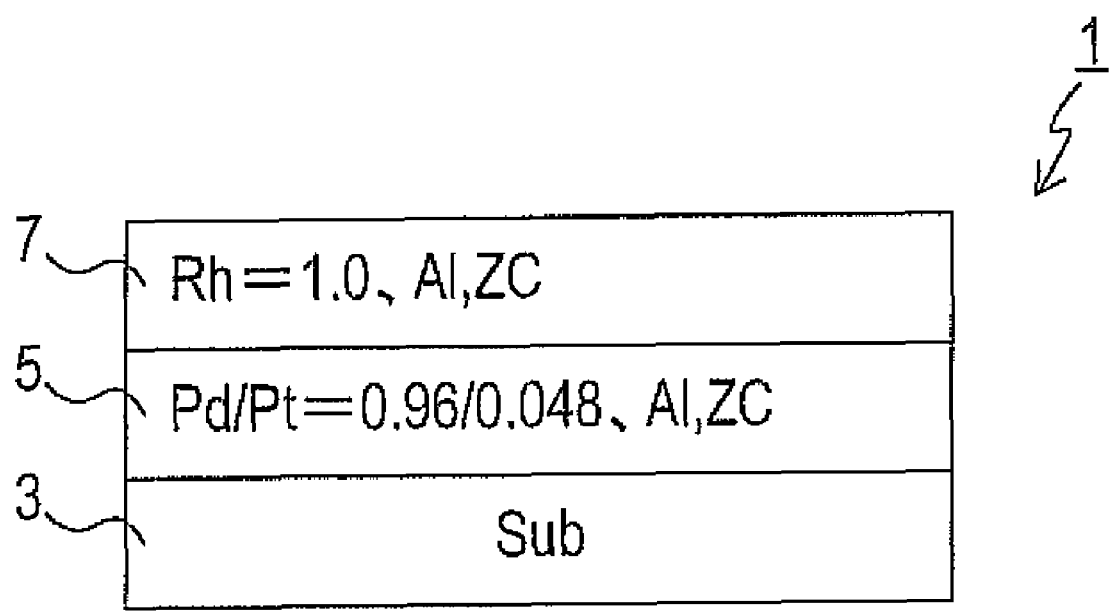
[FIG. 4] is an explanatory diagram showing a structure of an exhaust gas purifying catalyst according to an Embodiment 4.

The exhaust gas purifying catalyst 1 of an Embodiment 4 has basically the same structure as that of the Embodiment 1, as shown in FIG. 4. The Embodiment 4 is different from the Embodiment 1 in the amounts of the noble metals contained in the inside layer 5, that is, Pd: 0.96 g and Pt: 0.048 g.

The method of manufacturing the exhaust gas purifying catalyst 1 of the Embodiment 4 is basically the same as that of the Embodiment 1. In the Embodiment 4, a slurry S4 prepared by mixing below listed components was used in place of the slurry S1A.
(Slurry S4)
    alumina: 50 g
    Zr rich compound oxide (relative proportion of $ZrO_2$ is 80 wt %): 50 g
    Pd nitrate solution: an amount containing 0.96 g of Pd
    Pt nitrate solution: an amount containing 0.048 g of Pt In the Embodiment 4, a total amount of the slurry S4 was applied to coat the entire substrate 3, dried and calcined to form the inside layer 5. Thereafter, a total amount of the slurry S1B was applied to coat the entire substrate 3, dried and calcined to form the outside layer 7.

Embodiment 5

Figure 5:
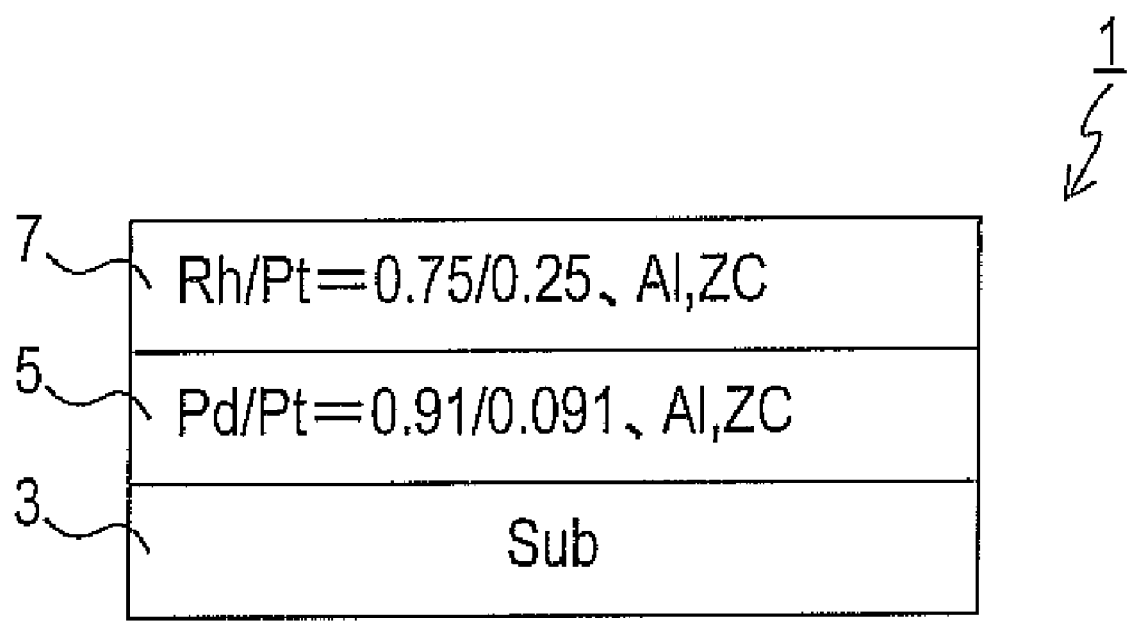
[FIG. 5] is an explanatory diagram showing a structure of an exhaust gas purifying catalyst according to an Embodiment 5.

The exhaust gas purifying catalyst 1 of an Embodiment 5 has basically the same structure as that of the Embodiment 1, as shown in FIG. 5. The Embodiment 5 is different from the Embodiment 1 in the amounts of the noble metals contained in the inside layer 5, that is, Pd: 0.91 g and Pt: 0.091 g. Also, the Embodiment 5 is different from the Embodiment 1 in the amounts of the noble metals contained in the outside layer 7, that is, Rh: 0.75 g and Pt: 0.25 g.

The method of manufacturing the exhaust gas purifying catalyst 1 of the Embodiment 5 is basically the same as that of the Embodiment 1. In the Embodiment 5, the slurry S2 was used in place of the slurry S1A. Also, a slurry S5 prepared by mixing below listed components was used in place of the slurry S1B.
(Slurry S5)
    alumina: 50 g
    Zr rich compound oxide (relative proportion of $ZrO_2$ is 80 wt %): 50 g
    Rh nitrate solution: an amount containing 0.75 g of Rh
    Pt nitrate solution: an amount containing 0.25 g of Pt In the Embodiment 5, a total amount of the slurry S2 was applied to coat the entire substrate 3, dried and calcined to form the inside layer 5. Thereafter, a total amount of the slurry S5 was applied to coat the entire substrate 3, dried and calcined to form the outside layer 7.

Embodiment 6

Figure 6:
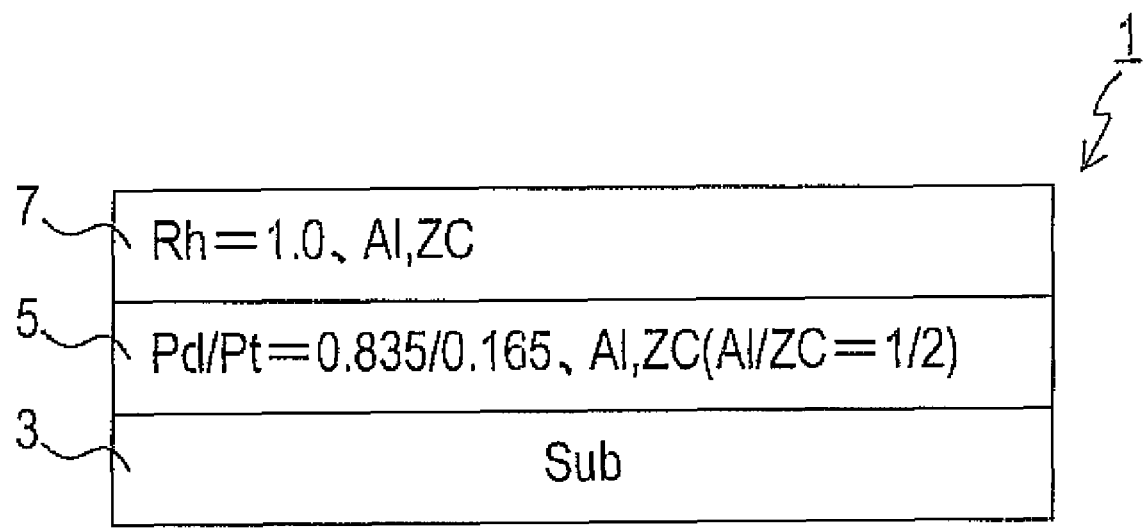
[FIG. 6] is an explanatory diagram showing a structure of an exhaust gas purifying catalyst according to an Embodiment 6.

The exhaust gas purifying catalyst 1 of an Embodiment 6 has basically the same structure as that of the Embodiment 1, as shown in FIG. 6. The Embodiment 6 is different from the Embodiment 1 in that the weight ratio of alumina (Al) to Zr rich compound oxide (ZC) contained in the inside layer 5 is 1:2.

The method of manufacturing the exhaust gas purifying catalyst 1 of the Embodiment 6 is basically the same as that of the Embodiment 1. In the Embodiment 6, a slurry S6 prepared by mixing below listed components was used in place of the slurry S1A.
(Slurry S6)
    alumina: 33 g
    Zr rich compound oxide (relative proportion of $ZrO_2$ is 80 wt %): 67 g
    Pd nitrate solution: an amount containing 0.835 g of Pd
    Pt nitrate solution: an amount containing 0.165 g of Pt In the Embodiment 6, a total amount of the slurry S6 was applied to coat the entire substrate 3, dried and calcined to form the inside layer 5. Thereafter, a total amount of the slurry S1B was applied to coat the entire substrate 3, dried and calcined to form the outside layer 7.

Embodiment 7

Figure 7:
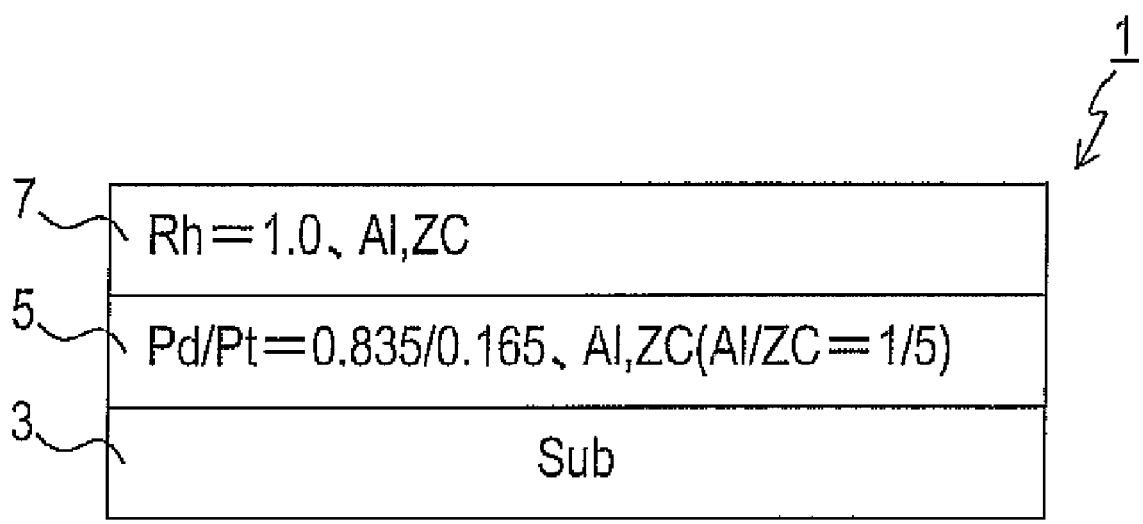
[FIG. 7] is an explanatory diagram showing a structure of an exhaust gas purifying catalyst according to an Embodiment 7.

The exhaust gas purifying catalyst 1 of an Embodiment 7 has basically the same structure as that of the Embodiment 1, as shown in FIG. 7. The Embodiment 7 is different from the Embodiment 1 in that the weight ratio of alumina (Al) to Zr rich compound oxide (ZC) contained in the inside layer 5 is 1:5.

The method of manufacturing the exhaust gas purifying catalyst 1 of the Embodiment 7 is basically the same as that of the Embodiment 1. In the Embodiment 7, a slurry S7 prepared by mixing below listed components was used in place of the slurry S1A.
(Slurry S7)
  alumina: 17 g
  Zr rich compound oxide (relative proportion of $ZrO_2$ is 80 wt %): 85 g
  Pd nitrate solution: an amount containing 0.835 g of Pd
  Pt nitrate solution: an amount containing 0.165 g of Pt In the Embodiment 7, a total amount of the slurry S7 was applied to coat the entire substrate 3, dried and calcined to form the inside layer 5. Thereafter, a total amount of the slurry S1B was applied to coat the entire substrate 3, dried and calcined to form the outside layer 7.

Embodiment 8

Figure 8:
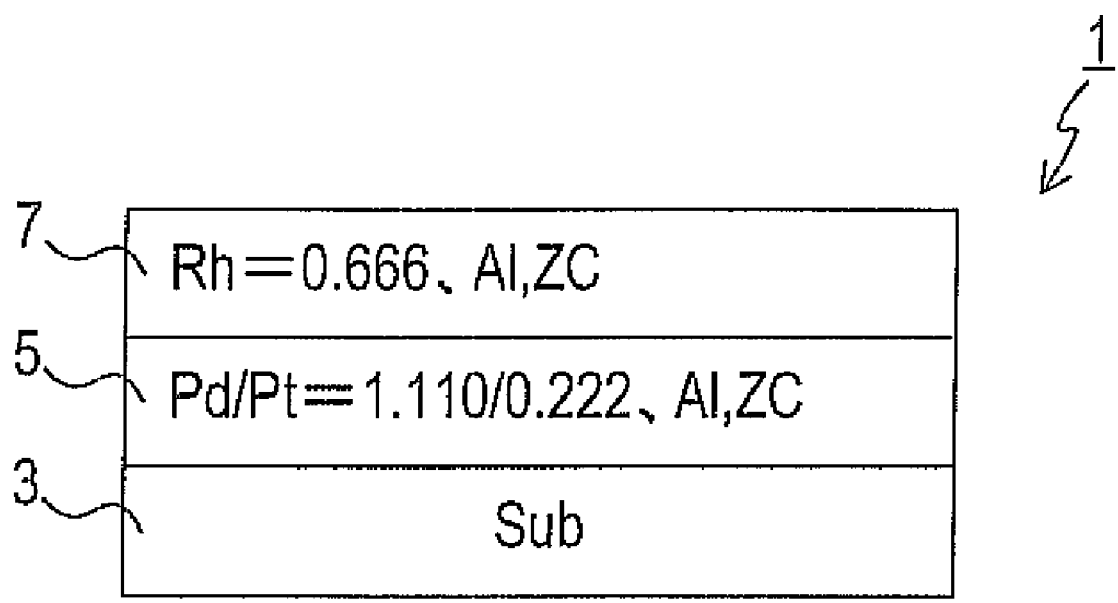
[FIG. 8] is an explanatory diagram showing a structure of an exhaust gas purifying catalyst according to an Embodiment 8.

The exhaust gas purifying catalyst 1 of an Embodiment 8 has basically the same structure as that of the Embodiment 1, as shown in FIG. 8. The Embodiment 8 is different from the Embodiment 1 in that the weights of Pd and Pt contained in the inside layer 5 are 1.110 g and 0.222 g, respectively. Also, the Embodiment 8 is different from the Embodiment 1 in that the weight of Rh contained in the outside layer 7 is 0.666 g.

The method of manufacturing the exhaust gas purifying catalyst 1 of the Embodiment 8 is basically the same as that of the Embodiment 1. In the Embodiment 8, a slurry S8A prepared by mixing below listed components was used in place of the slurry S1A.
(Slurry S8A)
  alumina: 50 g
  Zr rich compound oxide (relative proportion of $ZrO_2$ is 80 wt %): 50 g
  Pd nitrate solution: an amount containing 1.110 g of Pd
  Pt nitrate solution: an amount containing 0.222 g of Pt In addition, a slurry S8B prepared by mixing below listed components was used in place of the slurry S1B.
(Slurry S8B)
  alumina: 50 g
  Zr rich compound oxide (relative proportion of $ZrO_2$ is 80 wt %): 50 g
  Rh nitrate solution: an amount containing 0.666 g of Rh In the Embodiment 8, a total amount of the slurry S8A was applied to coat the entire substrate 3, dried and calcined to form the inside layer 5. Thereafter, a total amount of the slurry S8B was applied to coat the entire substrate 3, dried and calcined to form the outside layer 7.

Embodiment 9

Figure 9:
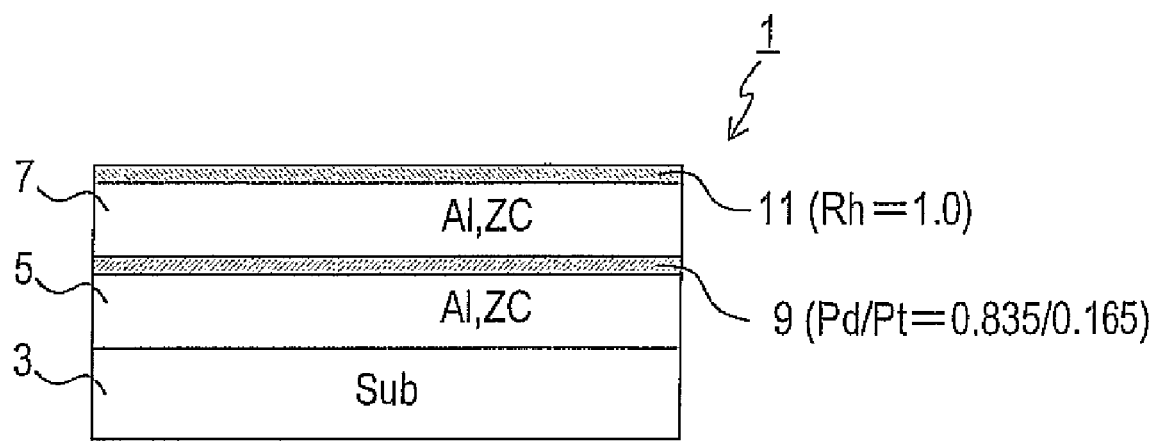
[FIG. 9] is an explanatory diagram showing a structure of an exhaust gas purifying catalyst according to an Embodiment 9.

The exhaust gas purifying catalyst 1 of an Embodiment 9 has basically the same structure as that of the Embodiment 1, as shown in FIG. 9. The Embodiment 9 is different from the Embodiment 1 in that all the noble metals contained in the inside layer 5 are carried in a region (surface region) 9 from the surface (boundary surface with the outside layer 7) of the inside layer 5 to the depth of 20 μm. Also, the Embodiment 9 is different from the Embodiment 1 in that all the noble metals contained in the outside layer 7 are carried in a region (surface region) 11 from the surface of the outside layer 7 to the depth of 20 μm. A total thickness of the entire inside layer 5 and a total thickness of the entire outside layer 7 are 100 μm, respectively.

The exhaust gas purifying catalyst 1 according to the Embodiment 9 was manufactured as below. Firstly, respective slurries S9A and S9B were prepared by mixing below listed components.
(Slurry S9A)
  alumina: 50 g
  Zr rich compound oxide (relative proportion of $ZrO_2$ is 80 wt %): 50 g
(Slurry S9B)
  alumina: 50 g
  Zr rich compound oxide (relative proportion of $ZrO_2$ is 80 wt %): 50 g A total amount of the slurry S9A was applied to coat the entire substrate 3. After dried at 250° C. for an hour, the coated substrate 3 was calcined at 500° C. for an hour to form the inside layer 5 (without carrying of noble metal at this time). Thereafter, the substrate 3 was soaked in a Pt nitride solution (containing 0.165 g of Pt) to carry Pt in the surface region 9 of the inside layer 5. Subsequently, the substrate 3 was soaked in a Pd nitride solution (containing 0.835 g of Pd) to carry Pd in the surface region 9 of the inside layer 5.

Next, a total amount of the slurry S9B was applied to coat the entire substrate 3. After dried at 250° C. for an hour, the coated substrate 3 was calcined at 500° C. for an hour to form the outside layer 7 (without carrying of noble metal at this time). Thereafter, the substrate 3 was soaked in a Rh nitride solution (containing 1.0 g of Rh) to carry Rh in the surface region 11 of the outside layer 7.

Figure 10:
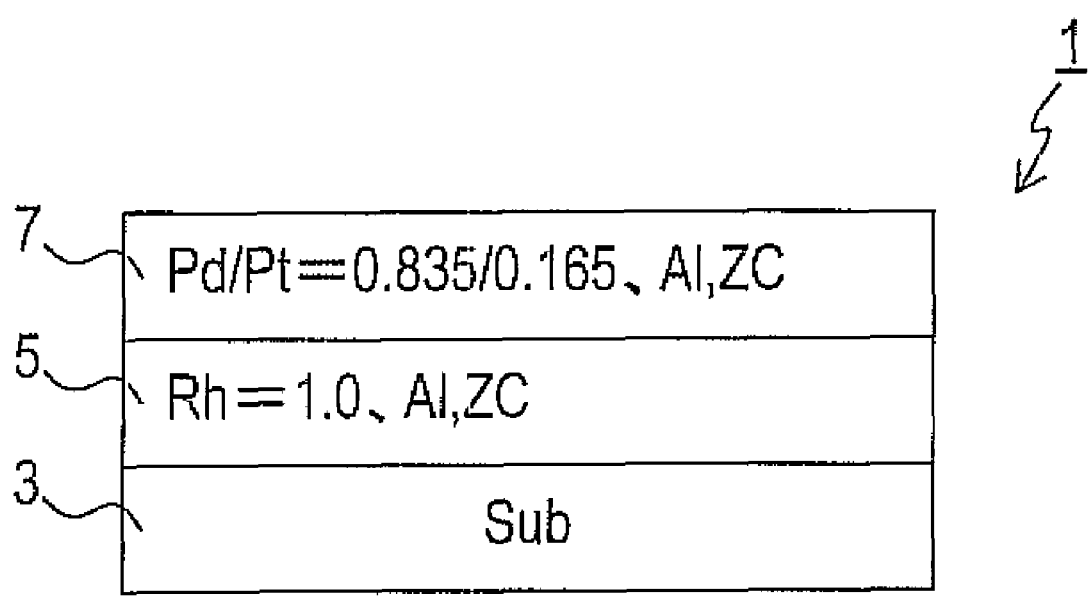
[FIG. 10] is an explanatory diagram showing a structure of an exhaust gas purifying catalyst according to an Embodiment 10.

Embodiment 10 a) A description will now be given on a structure of the exhaust gas purifying catalyst 1 of an Embodiment 10 with reference to FIG. 10. In the exhaust gas purifying catalyst 1, the inside layer (B-layer) 5 is formed on the surface of the substrate (catalyst substrate) 3, and the outside layer (A-layer) 7 is formed on top of the inside layer 5. The inside layer 5 and the outside layer 7 function as a catalyst coating layer. A thickness of the respective inside layer 5 and outside layer 7 is 100 μm. The substrate 3 has the same constitution as in the Embodiment 1.

The inside layer 5 includes Rh (1.0 g) as the noble metal, an alumina and a Zr rich compound oxide.

The outside layer 7 includes Pd (0.835 g) and Pt (0.165 g) as the noble metals, an alumina and a Zr rich compound oxide.

b) A description will now be given on a method of manufacturing the exhaust gas purifying catalyst 1 of the Embodiment 10.

Firstly, the slurries S1A and S1B were prepared in the same manner as in the Embodiment 1.

Then, a total amount of the slurry S1B was applied to coat the entire substrate 3. After dried at 250° C. for an hour, the coated substrate 3 was calcined at 500° C. for an hour. The inside layer 5 was formed by this step.

Thereafter, a total amount of the slurry S1A is applied to coat the entire substrate 3. After dried at 250° C. for an hour, the coated substrate 3 was calcined at 500° C. for an hour. The outside layer 7 was formed by this step thereby to finish the exhaust gas purifying catalyst 1.

Embodiment 11

The exhaust gas purifying catalyst 1 of an Embodiment 11 has basically the same structure as that of the Embodiment 1.

The Embodiment 11 is different from the Embodiment 1 in that the relative proportion of $ZrO_2$ in the Zr rich compound oxide contained in the inside layer 5 is 40 wt %.

The method of manufacturing the exhaust gas purifying catalyst 1 of the Embodiment 11 is basically the same as that of the Embodiment 1. The Embodiment 11 is different from the Embodiment 1 in that the relative proportion of $ZrO_2$ in the Zr rich compound oxide contained in a slurry to form the inside layer 5 is 40 wt %.

Comparative Example 1

Figure 11:
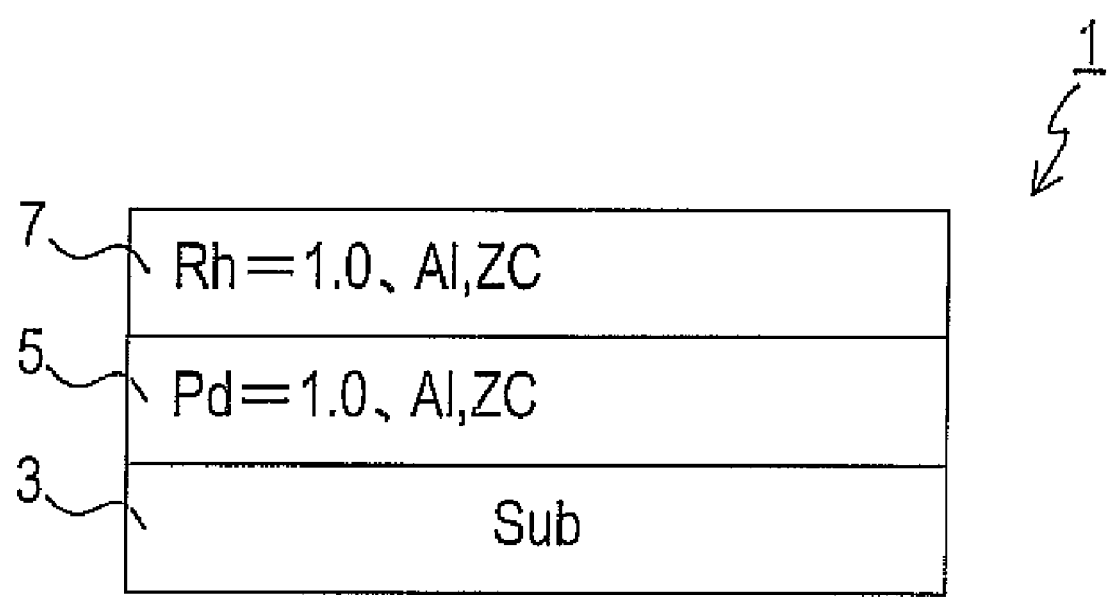
[FIG. 11] is an explanatory diagram showing a structure of an exhaust gas purifying catalyst according to a Comparative Example 1.

A description will now be given on a structure of the exhaust gas purifying catalyst 1 of a Comparative Example 1 with reference to FIG. 11. The exhaust gas purifying catalyst 1 includes the inside layer 5 and outside layer 7 formed on cell surfaces of the same substrate 3 as in the Embodiment 1. The inside layer 5 includes Pd (1.0 g) as the noble metal, an alumina and a Zr rich compound oxide. The outside layer 7 includes Rh (1.0 g) as the noble metal, an alumina and a Zr rich compound oxide.

A description will now be given on a method of manufacturing the exhaust gas purifying catalyst 1 of the Comparative Example 1.

Firstly, a slurry SP1 was prepared by mixing below listed components.
(Slurry SP1)
  alumina: 50 g
  Zr rich compound oxide (relative proportion of $ZrO_2$ is 80 wt %): 50 g
  Pd nitrate solution: an amount containing 1.0 g of Pd A total amount of the slurry SP1 was applied to coat the entire substrate 3, dried and calcined to form the inside layer 5. Thereafter, a total amount of the slurry S1B was applied to coat the entire substrate 3, dried and calcined to form the outside layer 7.

Comparative Example 2

Figure 12:
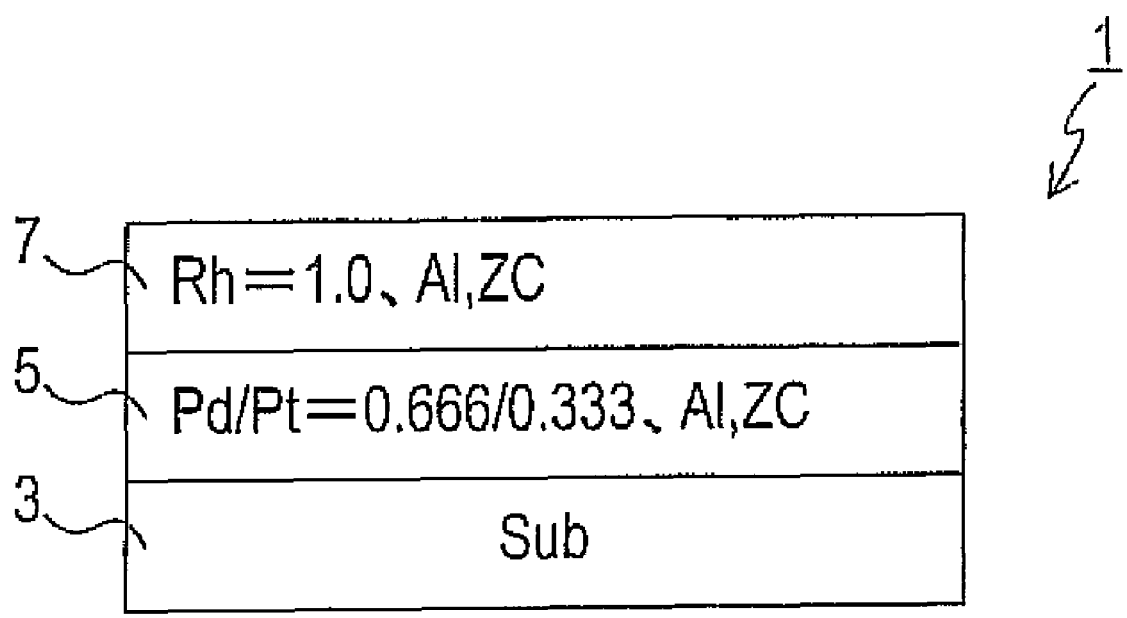
[FIG. 12] is an explanatory diagram showing a structure of an exhaust gas purifying catalyst according to a Comparative Example 2.

The exhaust gas purifying catalyst 1 of a Comparative Example 2 has basically the same structure as that of the Comparative Example 1, as shown in FIG. 12. The Comparative Example 2 is different from the Comparative Example 1 in the amounts of the noble metals contained in the inside layer 5, that is, Pd: 0.666 g and Pt: 0.333 g.

The method of manufacturing the exhaust gas purifying catalyst 1 of the Comparative Example 2 is basically the same as that of the Comparative Example 1. In the Comparative Example 2, a slurry SP2 prepared by mixing below listed components was used in place of the slurry SP1.
(Slurry SP2)
  alumina: 50 g
  Zr rich compound oxide (relative proportion of $ZrO_2$ is 80 wt %): 50 g
  Pd nitrate solution: an amount containing 0.666 g of Pd
  Pt nitrate solution: an amount containing 0.333 g of Pt In the Comparative Example 2, a total amount of the slurry SP2 was applied to coat the entire substrate 3, dried and calcined to form the inside layer 5. Thereafter, a total amount of the slurry S1B was applied to coat the entire substrate 3, dried and calcined to form the outside layer 7.

Comparative Example 3

Figure 13:
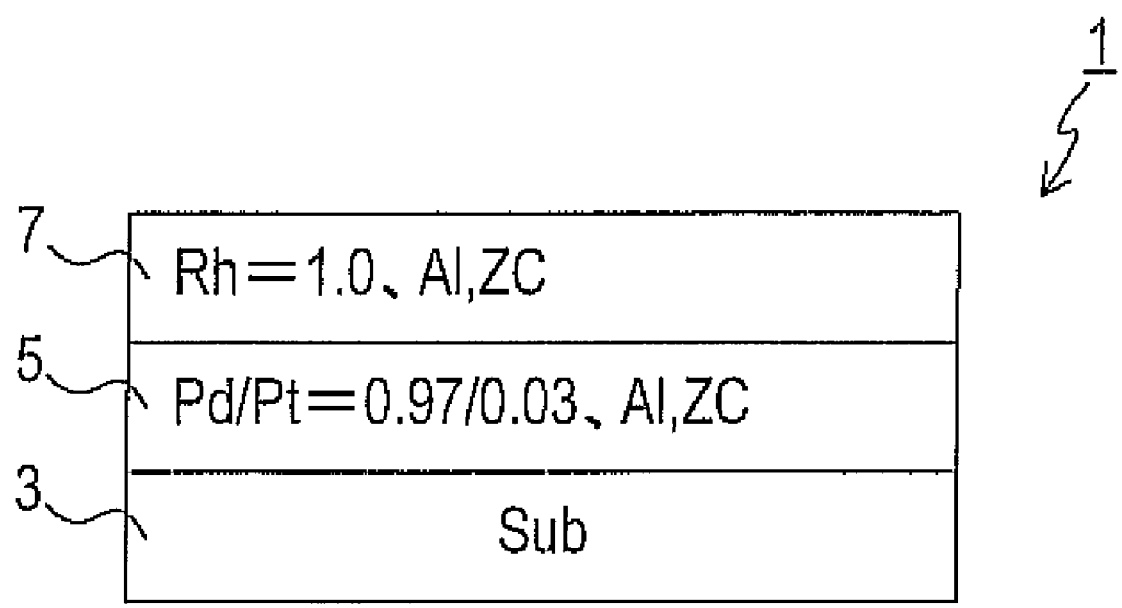
[FIG. 13] is an explanatory diagram showing a structure of an exhaust gas purifying catalyst according to a Comparative Example 3.

The exhaust gas purifying catalyst 1 of a Comparative Example 3 has basically the same structure as that of the Comparative Example 1, as shown in FIG. 13. The Comparative Example 3 is different from the Comparative Example 1 in the amounts of the noble metals contained in the inside layer 5, that is, Pd: 0.97 g and Pt: 0.03 g.

The method of manufacturing the exhaust gas purifying catalyst 1 of the Comparative Example 3 is basically the same as that of the Comparative Example 1. In the Comparative Example 3, a slurry SP3 prepared by mixing below listed components was used in place of the slurry SP1.
(Slurry SP3)
  alumina: 50 g
  Zr rich compound oxide (relative proportion of $ZrO_2$ is 80 wt %): 50 g
  Pd nitrate solution: an amount containing 0.97 g of Pd
  Pt nitrate solution: an amount containing 0.03 g of Pt In the Comparative Example 3, a total amount of the slurry SP3 was applied to coat the entire substrate 3, dried and calcined to form the inside layer 5. Thereafter, a total amount of the slurry S1B was applied to coat the entire substrate 3, dried and calcined to form the outside layer 7.

Comparative Example 4

Figure 14:
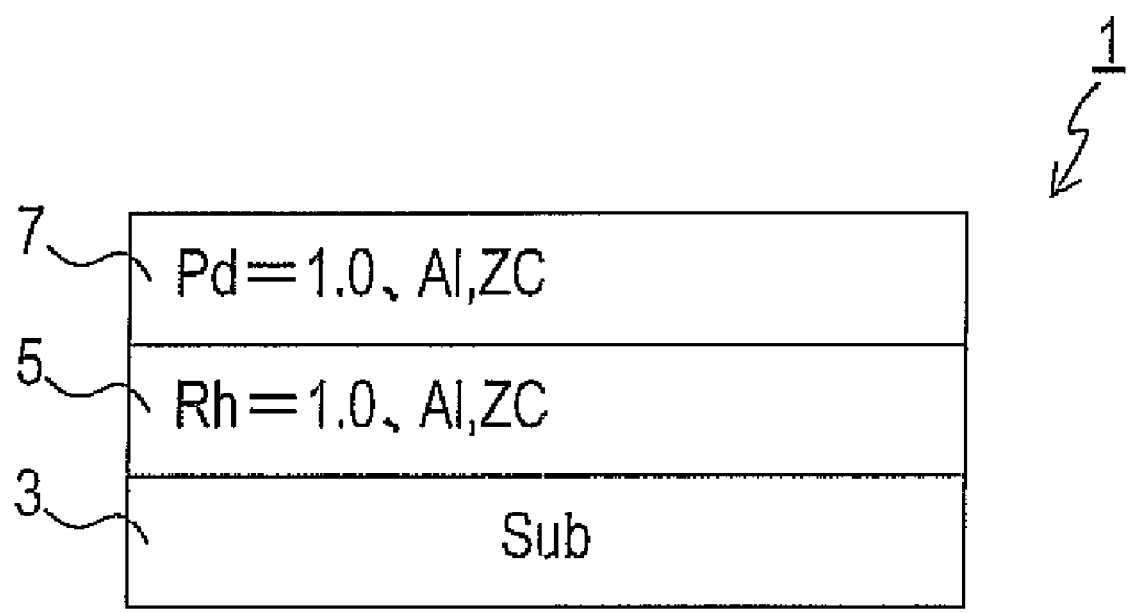
[FIG. 14] is an explanatory diagram showing a structure of an exhaust gas purifying catalyst according to a Comparative Example 4.

A description will now be given on a structure of the exhaust gas purifying catalyst 1 of a Comparative Example 4 with reference to FIG. 14. The exhaust gas purifying catalyst 1 includes the inside layer 5 and outside layer 7 formed on the cell surfaces of the same substrate 3 as in the Embodiment 1. The inside layer 5 includes Rh (1.0 g) as the noble metal, an alumina and a Zr rich compound oxide. The outside layer 7 includes Pd (1.0 g) as the noble metal, an alumina and a Zr rich compound oxide.

A description will now be given on a method of manufacturing the exhaust gas purifying catalyst 1 of the Comparative Example 4.

Firstly, the slurry S1B was prepared in the same manner as in the Embodiment 1. The slurry SP1 was prepared in the same manner as in the Comparative Example 1.

Then, a total amount of the slurry S1B was applied to coat the entire substrate 3, dried and calcined to form the inside layer 5. Thereafter, a total amount of the slurry SP1 was applied to coat the entire substrate 3, dried and calcined to form the outside layer 7.

Catalytic performance was tested for the exhaust gas purifying catalysts of the Embodiments 1 through 11 and the Comparative Examples 1 through 4.
(Test Method)

After conducting a durability test corresponding to 80,000 Km run, each of the exhaust gas purifying catalysts according to the embodiments and the comparative examples was mounted on an actual vehicle having an engine of 2.0 L displacement. HC, CO and NOx emissions were measured after running in the Japanese 11 mode.
(Test Results)

Table 1 shows the test results.

TABLE 1

| Sample | HC emission (g/test) | CO emission (g/test) | NOx emission (g/test) |
|---|---|---|---|
| Embodiment 1 | 0.46 | 4.98 | 0.38 |
| Embodiment 2 | 0.48 | 5.02 | 0.41 |
| Embodiment 3 | 0.52 | 5.33 | 0.48 |
| Embodiment 4 | 0.52 | 5.23 | 0.49 |
| Embodiment 5 | 0.52 | 5.19 | 0.49 |
| Embodiment 6 | 0.44 | 4.94 | 0.35 |
| Embodiment 7 | 0.44 | 4.96 | 0.36 |
| Embodiment 8 | 0.54 | 5.25 | 0.50 |
| Embodiment 9 | 0.40 | 4.90 | 0.33 |
| Embodiment 10 | 0.48 | 5.29 | 0.50 |
| Embodiment 11 | 0.56 | 5.60 | 0.55 |
| Comparative Example 1 | 0.68 | 6.30 | 0.68 |

TABLE 1-continued

| Sample | HC emission (g/test) | CO emission (g/test) | NOx emission (g/test) |
|---|---|---|---|
| Comparative Example 2 | 0.62 | 6.12 | 0.61 |
| Comparative Example 3 | 0.63 | 6.08 | 0.62 |
| Comparative Example 4 | 0.71 | 6.41 | 0.73 |

As shown in Table 1, the HC, CO and NOx emissions of the exhaust gas purifying catalysts according to the Embodiments 1 through 11 were remarkably low as compared to those of the Comparative Examples 1 through 4. Specifically, the emissions of the exhaust gas purifying catalyst according to the Embodiment 9 are further low, since Pd and Pt in the inside layer 5 is contained in the surface region 9 and Rh in the outside layer 7 is contained in the surface region 11. Also, the emissions of the exhaust gas purifying catalysts according to the Embodiments 6 and 7 are further low, since the respective weight ratio of alumina to Zr rich compound oxide contained in the inner layer 5 is 1:2 in the Embodiment 6 and 1:5 in the Embodiment 7. From the above experiments, it was confirmed that the catalytic performances of the exhaust gas purifying catalysts according to the Embodiments 1 through 11 are excellent.

Although the same amount of the noble metals are used in the Embodiments 1 through 11 and the Comparative Examples 1 through 4, the catalytic performances of the Embodiments 1 through 11 are superior. Accordingly, the present invention brings about decrease in the amount of noble metals used while the catalytic performance is maintained.

It is to be understood that the present invention should not be limited to the above described embodiments, but may be practiced in various forms within the scope not departing from the present invention.

The invention claimed is:

1. An exhaust gas purifying catalyst comprising:
a catalyst substrate; and
a catalyst coating layer containing a noble metal and a refractory inorganic oxide, and formed on the catalyst substrate,
wherein the catalyst coating layer has a layered structure including an A-layer and a B-layer,
the A-layer contains Pd and Pt as the noble metal in a weight ratio from 3:1 to 20:1,
the B-layer contains Rh as the noble metal, and
the A-layer and the B-layer respectively include two layers having different noble metal concentrations.

2. The exhaust gas purifying catalyst according to claim 1, wherein the A-layer contains:
(a) an alumina; and
(b) a cerium-zirconium compound oxide in which a relative proportion of $ZrO_2$ is 40 to 95 wt %, as the refractory inorganic oxide, a weight ratio of (a) to (b) is in a range from 1:1 to 1:5.

3. The exhaust gas purifying catalyst according to claim 1, wherein 70 wt % or more of Pd and Pt contained in the A-layer is in a region from a surface of the A-layer to a depth of 20 μm.

4. The exhaust gas purifying catalyst according to claim 2, wherein 70 wt % or more of Pd and Pt contained in the A-layer is in a region from a surface of the A-layer to a depth of 20 μm.

5. The exhaust gas purifying catalyst according to claim 1, wherein 70 wt % or more of Rh contained in the B-layer is in a region from a surface of the B-layer to a depth of 20 μm.

6. The exhaust gas purifying catalyst according to claim 2, wherein 70 wt % or more of Rh contained in the B-layer is in a region from a surface of the B-layer to a depth of 20 μm.

7. The exhaust gas purifying catalyst according to claim 3, wherein 70 wt % or more of Rh contained in the B-layer is in a region from a surface of the B-layer to a depth of 20 μm.

8. The exhaust gas purifying catalyst according to claim 4, wherein 70 wt % or more of Rh contained in the B-layer is in a region from a surface of the B-layer to a depth of 20 μm.

9. The exhaust gas purifying catalyst according to claim 1, wherein the B-layer contains a cerium-zirconium compound oxide as the refractory inorganic oxide, and
a relative proportion of $ZrO_2$ in the cerium-zirconium compound oxide is 50 to 95 wt %.

10. The exhaust gas purifying catalyst according to claim 2, wherein the B-layer contains a cerium-zirconium compound oxide as the refractory inorganic oxide, and
a relative proportion of $ZrO_2$ in the cerium-zirconium compound oxide is 50 to 95 wt %.

11. The exhaust gas purifying catalyst according to claim 3, wherein the B-layer contains a cerium-zirconium compound oxide as the refractory inorganic oxide, and
a relative proportion of $ZrO_2$ in the cerium-zirconium compound oxide is 50 to 95 wt %.

12. The exhaust gas purifying catalyst according to claim 4, wherein the B-layer contains a cerium-zirconium compound oxide as the refractory inorganic oxide, and
a relative proportion of $ZrO_2$ in the cerium-zirconium compound oxide is 50 to 95 wt %.

13. The exhaust gas purifying catalyst according to claim 1, wherein the B-layer contains Pt in addition to Rh as the noble metal, and a weight of Pt in the B-layer is one third or less of a weight of Rh.

14. The exhaust gas purifying catalyst according to claim 2, wherein the B-layer contains Pt in addition to Rh as the noble metal, and a weight of Pt in the B-layer is one third or less of a weight of Rh.

15. The exhaust gas purifying catalyst according to claim 3, wherein the B-layer contains Pt in addition to Rh as the noble metal, and a weight of Pt in the B-layer is one third or less of a weight of Rh.

16. The exhaust gas purifying catalyst according to claim 4, wherein the B-layer contains Pt in addition to Rh as the noble metal, and a weight of Pt in the B-layer is one third or less of a weight of Rh.

17. The exhaust gas purifying catalyst according to claim 1, wherein each of the A-layer and the B-layer comprise a first layer and a second layer;
the first layer of the A-layer directly coats the catalyst substrate and the first layer of the B-layer directly coats the second layer of the A-layer; and
the second layer of the A-layer comprises a greater weight percent of Pd and Pt than a weight percent of Pd and Pt in the first layer of the A-layer.

18. The exhaust gas purifying catalyst according to claim 1, wherein each of the A-layer and the B-layer comprise a first layer and a second layer;
the first layer of the A-layer directly coats the catalyst substrate and the first layer of the B-layer directly coats the second layer of the A-layer; and
the second layer of the B-layer comprises a greater weight percent of Rh than a weight percent of Rh in the first layer of the B-layer.

19. The exhaust gas purifying catalyst according to claim 1, wherein each of the A-layer and the B-layer comprise a first layer and a second layer;
- the first layer of the A-layer directly coats the catalyst substrate and the second layer of the A-layer directly coats the first layer of the A-layer;
- the first layer of the B-layer directly coats the second layer of the A-layer and the second layer of the B-layer directly coats the first layer of the B-layer;
- the second layer of the A-layer comprises a greater weight percent of Pd and Pt than a weight percent of Pd and Pt in the first layer of the A-layer; and
- the second layer of the B-layer comprises a greater weight percent of Rh than a weight percent of Rh in the first layer of the B-layer.

20. An exhaust gas purifying catalyst comprising:
a catalyst substrate;
a catalyst coating layer containing a noble metal and a refractory inorganic oxide, and formed on the catalyst substrate;
wherein the catalyst coating layer has a layered structure including an A-layer and a B-layer;
the A-layer directly coats the catalyst substrate and contains Pd and Pt as the noble metal in a weight ratio from 3:1 to 20:1;
the B-layer directly coats the A-layer and contains Rh as the noble metal, and
the A-layer and the B-layer respectively include two layers having different noble metal concentrations.

* * * * *